United States Patent
Wagner et al.

(10) Patent No.: US 10,058,956 B2
(45) Date of Patent: Aug. 28, 2018

(54) METALWORKING WIRE FEEDER SYSTEM WITH FORCE CONTROL OPERATION

(71) Applicant: Illinois Tool Works Inc., Glenview, IL (US)

(72) Inventors: Dustin Wagner, Appleton, WI (US); William Giese, Monee, IL (US); Rick Hutchison, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 260 days.

(21) Appl. No.: 14/943,270

(22) Filed: Nov. 17, 2015

(65) Prior Publication Data

US 2017/0136579 A1    May 18, 2017

(51) Int. Cl.
| | |
|---|---|
| *B23K 26/00* | (2014.01) |
| *B23K 26/70* | (2014.01) |
| *H05B 3/00* | (2006.01) |
| *B23K 9/10* | (2006.01) |
| *B23K 9/12* | (2006.01) |

(52) U.S. Cl.
CPC .......... *B23K 26/702* (2015.10); *B23K 9/1093* (2013.01); *B23K 9/124* (2013.01); *H05B 3/0004* (2013.01)

(58) Field of Classification Search
CPC ...... B23K 26/702; B23K 9/093; B23K 9/124; B23K 9/0956; H05H 1/26; H05H 1/42; H05B 3/0004
USPC ............ 219/121.85, 121.63, 121.64, 121.66, 219/76.15, 76.16
See application file for complete search history.

(56) References Cited

U.S. PATENT DOCUMENTS

| | | | |
|---|---|---|---|
| 2002/0117485 A1* | 8/2002 | Jones ................... | B23K 1/0018 219/121.64 |
| 2013/0297658 A1* | 11/2013 | Guarraci ........... | G06F 17/30233 707/797 |
| 2013/0327749 A1* | 12/2013 | Denney ................ | B23K 9/0956 219/137 PS |
| 2014/0008334 A1 | 1/2014 | Ash et al. | |
| 2015/0251275 A1 | 9/2015 | Denney et al. | |

OTHER PUBLICATIONS

T. Ueyama, et al.; "Effects of Torch Configuration and Welding Current on Weld Bead Formation in High Speed Tandem Pulsed Gas Metal Arc Welding of Steel Sheets"; Science and Technology of Welding and Joining, vol. 10, No. 6; pp. 750-760.
European Extended Search Report dated Feb. 27, 2017 for EP 16189237.7 (7 pages).
Canadian Office Action for Appn. No. 2,941,976 dated Aug. 30, 2017 (7 pages).

* cited by examiner

*Primary Examiner* — Mark Paschall
(74) *Attorney, Agent, or Firm* — McAndrews, Held & Malloy, Ltd.

(57) ABSTRACT

A method for controlling a metalworking operation. The method includes measuring a force feedback from a wire being fed from a feeder, the wire contacting a workpiece, determining a change in the force of the force feedback, and adjusting either a heating of the wire or a feed rate of the wire based at least in part on the change in the force of the force feedback. Also disclosed are apparatus for effecting the foregoing.

24 Claims, 8 Drawing Sheets

METALWORKING WIRE FEEDER SYSTEM WITH FORCE CONTROL OPERATION

CROSS-REFERENCE TO RELATED APPLICATIONS

This application is related to concurrently filed and commonly assigned patent application Ser. No. 14/943,285, entitled "Metalworking Wire Feeder System With Force Control Start Operation," which is incorporated herein by reference in its entirety.

TECHNICAL FIELD

The present disclosure relates generally to metalworking equipment and methods, and more specifically to welding, cladding and additive manufacturing control systems.

BACKGROUND

Hot wire welding and cladding are processes where a metal filler wire is heated to a softened or plastic state, usually resistively, by passing an electrical current through it. This reduces the amount of added heat from another source needed for the base metal of a workpiece to which the heated wire is applied. The wire is typically fed in front of or behind a high-power energy source such as a laser or plasma that further melts the wire material, often along with the base metal of the workpiece, to produce a weld or clad. This puddle can also be referred to as the welding or cladding spot.

Wire feeders are used in various welding and cladding applications to feed the wire to the welding or cladding spot. Such wire can be referred to as filler wire, additive wire or consumable wire.

During operation, the wire is fed into or near the puddle. This way, when a workpiece is moved relative to the welding or cladding arrangement (with either the workpiece moved or the welding or cladding equipment moved), the puddle can be maintained to create a continuous weld or cladding layer.

In hot wire welding, the start of wire feeding is sequenced very precisely to prevent arcing, or overfeeding of the wire before the process can stabilize and be in a steady state. Commonly, first the wire feed is initiated. Second, the wire contacts the workpiece. Third, heating power (e.g., electrical current applied through the wire, which has some resistance) is applied to the wire. Fourth, the wire heats to a softened/plastic/semi-liquidus phase at the weld/clad spot, namely the weld/clad puddle. Fifth, feeding and sustained high-power energy heating of the wire occurs in the steady state.

The use of hot wire welding, such as tungsten inert gas welding, tends to be more part-related and industry-related. For example, hot wire TIG is used extensively in the transportation and power generation industries. It's big in shipbuilding, and for rebuilding turbine shafts for large power plants. Hot wire TIG also is used in cladding very large valve welds such as those for oil industry in which welders clad the inside of the valve weld with high-performance alloys.

Current hot wire welding and cladding machines rely on welding voltage and current to control the process of resistively heating a wire. These parameters may also be used to calculate power, resistance, and extension. It is important to control the resistive heating process so that the wire is heated to sufficient temperature but also so that an arc is not generated between the wire and the workpiece. The temperature of the wire should be high enough that the wire plastically deforms at its end. However, if the temperature is too high, the end of the wire will turn liquid and electromagnetic pinch forces can cause an arc to be established. Arcing will disrupt the precise resistive heating going into the wire, can cause inconsistencies throughout the weld, and will require eye protection from the arc rays. Arcing can also be detrimental to cladding processes by causing considerable base metal melting, thus influencing the dilution of the cladding. The process of starting the welding or cladding operation is particularly prone to arcing.

When controlling the hot wire process to avoid arcing by relying on voltage and current feedback, information about the particular type of wire that is being used is necessary. Since different wire types have different parameters, such as melting temperature, electrical resistivity, heat capacity, and thermal conductivity, each wire type requires its own program or input of particular parameters into the welding or cladding machine in order to ensure successful operation.

SUMMARY

Embodiments of the present disclosure employ force feedback from the wire to control a metalworking operation. The force feedback is provided by means of a signal indicative of a force on the wire. When feeding to air, i.e., when the wire encounters no obstacle, the force should be zero or null. When the wire encounters a fixed obstacle such as a workpiece, the force, absent a change in the exertion of the feeder mechanism used to feed the wire, will essentially be the counter force to that exerted by the feeder mechanism.

As used herein, a metalworking operation means and includes a welding operation, a cladding operation and an additive manufacturing operation. A hotwire is a wire that is preliminarily heated, typically resistively, during application of the wire in an operation. High power energy is applied to the wire, or the wire and the workpiece, to melt the wire, or the wire and a portion of the workpiece, respectively. An additive manufacturing operation uses molten wire to deposit metal to produce products. An example of an additive manufacturing process is what can be referred to as 3-D printing processes.

The use of force feedback as disclosed herein eliminates or significantly reduces the need to change programs or enter specific wire parameters when changing wires because the force generated by the wire with plastic deformation at the tip is substantially similar among different wires and wire types.

In an embodiment of using wire force feedback during the start of the welding or cladding operation, a controlled start is achieved and arcing is avoided by preheating the end of the wire and using force feedback instead of, or in addition to, voltage and current feedback.

In an embodiment, a method includes detecting an initial contact between a wire being fed from a feeder apparatus and a workpiece and, in response to the detection, halting feeding of the wire from the welding apparatus. The method further includes activating a high energy heat source configured to heat a tip of the wire and resuming the feeding of the wire from the feeder apparatus when the tip of the wire is heated to a plastic state by the high energy heat source to a softened state. The feeding of the wire is resumed in accordance with force feedback from the wire contacting the workpiece.

In an embodiment, after initial contact of the wire with the workpiece and prior to activating the high energy heat source configured to heat a tip of the wire to a softened state, the wire is subjected to preliminary heating with another energy source.

In an embodiment, after initial contact of the wire with the workpiece and prior to activating the high energy heat source configured to heat a tip of the wire to a softened state, the wire is subjected to resistive heating with another energy source.

In an embodiment, a method includes measuring a force feedback from a wire being fed under steady state conditions, i.e., following start-up conditions, from a feeding apparatus, the wire contacting a workpiece. The method further includes determining a change in the force of the force feedback, and adjusting or controlling heating of the wire, a feed rate of the wire, or both based at least in part on the change in the force. These steps can be undertaken using force feedback sensors and processing circuitry, which can include a processor. Preferably, the heating of the wire is adjusted to maintain a constant feed rate of the wire.

In an embodiment, the method steps employ a constant torque methodology.

In an embodiment, the force feedback is determined by sensing and measuring a load placed on a load cell.

In an embodiment, the force feedback is determined by sensing and measuring a motor speed of a wire feeder motor.

In an embodiment, the force feedback is determined by sensing and measuring motor current used by a wire feeder motor.

In an embodiment, the force feedback is determined by sensing and measuring output from a dynamometer measuring torque exerted by a wire feeder motor.

In an embodiment, the force feedback is used to adjust the heating of the wire so as to maintain constant feed speed.

In an embodiment, the method includes determining, by means of a processor, a force error for the force feedback based on a predetermined threshold, and adjusting, by means of the processor, a heating current used for heating of the wire based at least in part on the force error when the force error is outside of a predetermined force threshold.

In an embodiment, the control over the heating of the wire or the feed rate of the wire employs a proportional control arrangement.

In an embodiment, the control over the heating of the wire of the feed rate of the wire employs a proportion-integral-differential control arrangement.

In an embodiment, there is provided a non-transitory storage medium in which there is stored program instructions which when executed by a processor effect any of the method embodiments described above.

In an embodiment, a method for controlling a metalworking operation is provided. The method includes measuring, by means of a processor, a force feedback from a wire being fed from a feeding apparatus, the wire contacting a workpiece, and adjusting, by means of the processor, heating of the wire based at least in part on the force feedback.

In an embodiment, the method further includes determining, by means of the processor, a force error of the force feedback based on a predetermined threshold, and adjusting, by means of the processor, heating of the wire based at least in part on the force error.

In an embodiment, a metalworking apparatus is provided. The apparatus includes a mechanism configured to feed a wire from a feeder gun onto a workpiece and a heating power supply configured to supply heating energy, preferably a current, to the wire. The apparatus further includes circuitry configured to (a) measure a force feedback from the wire contacting the workpiece, (b) determine a change in the force feedback, and (c) adjust the heating current, a feed rate of the wire, or both based at least in part on the change in the force feedback. The circuitry preferably includes or is a processor.

In an embodiment, the control circuitry implements a constant torque control scheme.

In an embodiment, the processor is configured to (a) determine a force error for the force feedback based on a predetermined force threshold, and (c) adjust the heating current based at least in part on the force error when the force error is outside of the predetermined force threshold.

In other embodiments, the apparatus is configured with circuitry and sensors to employ at least one of the methods mentioned above.

These and other features and aspects are discussed in greater detail below in the detailed description with reference to the accompanying drawings.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
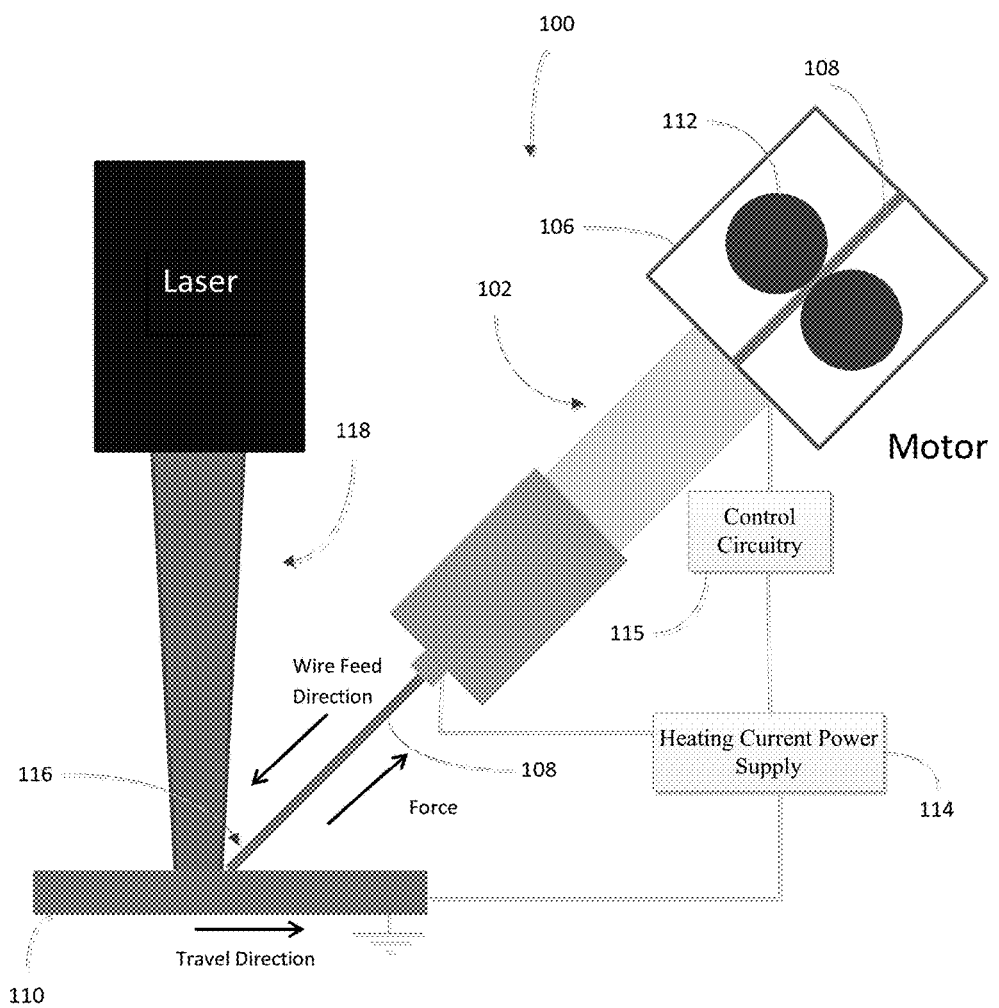
FIG. 1 is a diagram illustrating an exemplary welding system environment in which one embodiment of the present disclosure may operate.

The present disclosure is herein described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the present disclosure.

Referring to FIG. 1, a hot wire metalworking system 100 is shown. Although referred to herein mostly as a welding or cladding system, it can be understood that the principles disclosed herein are equally applicable to an additive manufacturing process, given the similar feeding of wire and the application of cladding principles to build up layers of metal from the wire to produce a product.

As discussed in further detail below, the system 100 uses force feedback from the wire to control the welding or cladding operation throughout the entire process. Since the force generated by the wire from plastic deformation at the tip is substantially similar among different wires and wire types, using force feedback from the wire to control the process eliminates or significantly reduces the need to change control programs governing the operation of the welding apparatus, as well as the need to enter specific wire parameters when changing wires.

In the illustrated embodiment, the system 100 includes a welding apparatus 102 having a torch 104. The apparatus 102 further includes a wire feeder 106 that feeds the wire 108 onto the workpiece 110. As is known, a feeder such as feeder 106 includes a motor that operates drive rolls 112 that feed the wire 108 through the torch 104. In the illustrated embodiment, a resistive heating power supply 114 applies resistive heating current to the wire when the wire contacts the workpiece 110. In various embodiments, the resistive heating power supply 114 is an AC or DC power supply controlled by means of a processor 115 associated with the welding apparatus 102. Although the resistive heating power supply 114 and the control circuitry 115 are schematically illustrated as being external to the welding apparatus 102, those skilled in the art will realize that the power supply 114 and/or the control circuitry 115 may be either internal or external to the welding apparatus 102.

Those skilled in the art will understand that the control circuitry is representative of various circuit configurations that can implement a control logic such as a proportional control, a proportional-integral-differential control or any other suitable control that uses a feedback signal to adjust an operating parameter. Further, the control circuitry 115 is representative of different circuit structures for implementing such control logic, be it analog or digital control, and whether it be implemented using hardware, firmware, software or some combination of the foregoing. The control circuitry 115 may include a processor to execute program code which is stored in a separate non-transitory memory device or integrated into the processor chip itself.

Further, those skilled in the art will also understand that although a resistive heating arrangement is described, other methods and arrangements can be used such as heat sources.

In embodiments, the force from the wire 108 may be determined or indicated from various devices including a force measuring device, such as a load cell transducer built into the torch 104 or by using a stand-alone apparatus that directly measures the force. A dynamometer can be attached to the feeder motor shaft and torque exerted by the feeder motor can be measured. Additionally, a suitable speed sensor can be used to measure motor shaft or feeder wheel speed, with speed correlated to the amount of torque exerted by the motor.

In another embodiment, the force from the wire 108 may be inferred from another measurement, such as the wire feed motor current, that indirectly measures the force. In such an embodiment, the current that is sent to the motor of the feeder 106 varies to maintain a constant wire feed speed. If there is a large force at the end of the wire 108, pushing back in the direction of wire travel, the motor of the feeder 106 will need an increase in the current to be able to keep feeding the wire 108 forward at the desired constant speed. Based on the variations in the wire feed current supplied to the motor 106, a force at the wire tip can be inferred. Methods and circuitry for reading motor currents are well known, as are methods and circuitry for detecting increase in motor current due to, e.g., counter forces on the rotation of the shaft of the motor.

Figure 2:
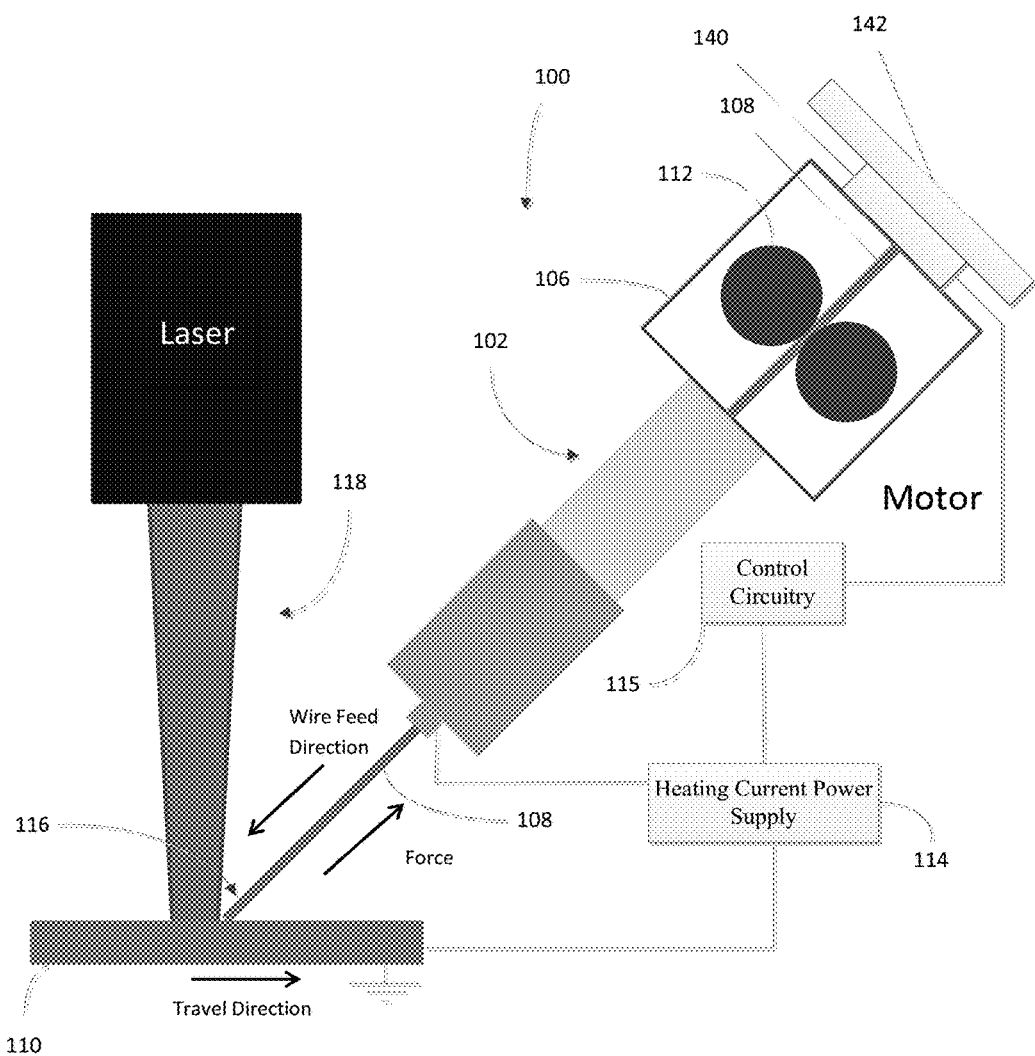
FIG. 2 is a diagram illustrating an exemplary welding system environment in which another embodiment of the present disclosure may operate.

In FIG. 2, a load cell 140 is illustrated position between one end of the feeder 106 and a surface 142. It can be appreciated that the feeder would be permitted some movement to allow a force to be registered by the load cell 140 as the feeder 106 is forced back against the surface 142.

Figure 3:
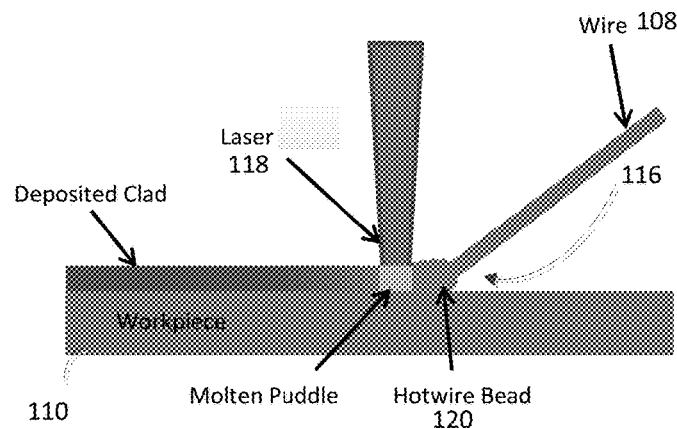
FIGS. 3-4 are block diagrams illustrating a hot wire operation of the welding system of FIG. 1 in further detail, according to an embodiment.
Figure 4:
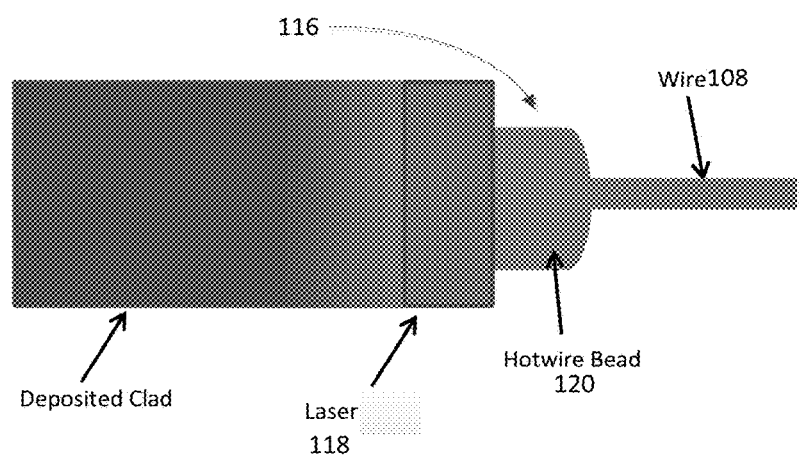

The force measurement, whether direct or indirect, is used to determine an error from a predetermined force set point. Based on the force error, a resistive heating current supplied to the wire 108 is adjusted. Optionally, the adjustment in the resistive heating current takes into account a predetermined system gain factor. In an embodiment, the gain factor represents a correction value associated with system response time. As further shown in FIGS. 3-4, an increase in resistive heating current raises the temperature in the wire 108 and makes plastic deformation 120 at wire tip 116 easier, which results in a lower force reading. A decrease in resistive heating current lowers the temperature in the wire 108 and makes plastic deformation 120 more difficult, which results in a larger force reading.

To achieve a controlled start of the welding or cladding operation, an end 116 of the wire 108 is preheated with a high energy heat source, such as a laser 118. Wire force feedback is then used instead of, or in addition to, voltage and current feedback to achieve a controlled start and prevent arcing, as described in further detail below.

Figure 5:
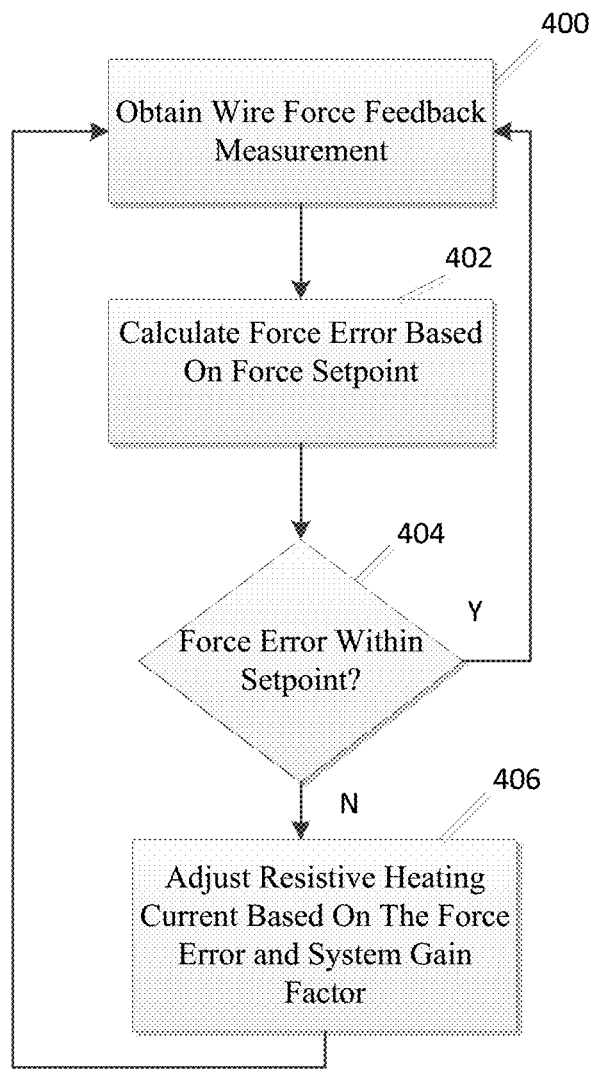
FIG. 5 is a flow chart illustrating a method of force control operation of the welding system of FIG. 1, according to an embodiment.

Referring to FIG. 5, an embodiment of a method for hot wire welding and cladding using wire force feedback is shown. In step 400, the welding apparatus control circuitry 115 obtains a measurement of force feedback from the wire 108. As discussed above, the force feedback from the wire 108 may be measured directly via a force measuring device, such as a dynamometer or a load cell transducer built into or otherwise connected to the welding apparatus 102, or it may be inferred based on the variation in the wire feed current required by the motor 106 to keep the wire feed speed constant. In step 402, the control circuitry 115 determines an error in the force feedback reading with respect to a predetermined force feedback set point or threshold range that, for instance, corresponds to the state of plastic deformation at the wire tip 116. In step 404, if the force error is within the predetermined force error threshold range, the method returns to step 400. Otherwise, in steps 404-406, if the force error is outside of a predetermined threshold, the control circuitry 115 either increases or decreases resistive heating current applied to the wire through the contact tip and workpiece. This correspondingly increases or decreases the wire temperature to ensure plastic deformation at the tip 116 while preventing the tip 116 of the wire 108 from becoming liquid. For example, a force error determination that is above the predetermined threshold indicates that the temperature of the wire 108 needs to be increased to facilitate plastic deformation at the tip 116. On the other hand, a force error determination below the predetermined threshold indicates that wire temperature needs to be decreased to prevent the tip 116 from becoming liquid. Alternatively or in addition, the control circuitry 115 varies one or more of the wire feed speed and power output of the laser 118 in order to ensure plastic deformation of the wire tip 116, while preventing it from turning liquid.

Figure 6:
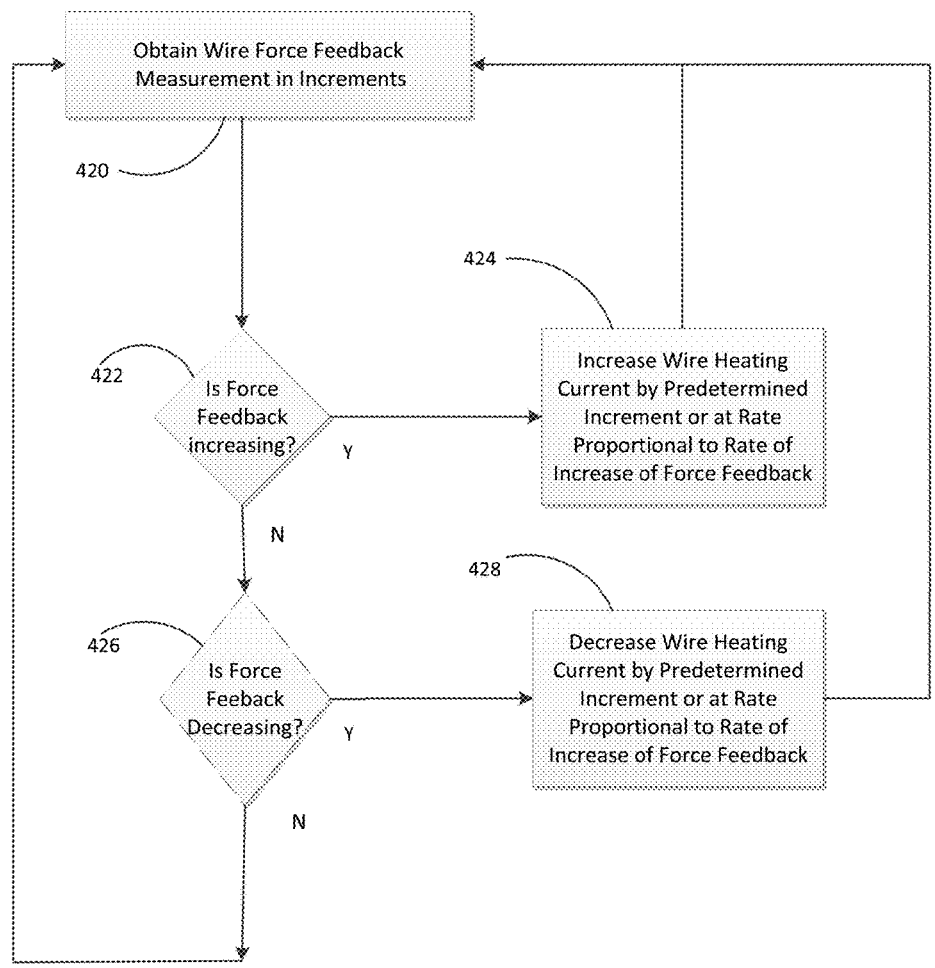
FIG. 6 is a flow chart illustrating another method of force control operation for the welding system of FIG. 1, according to an embodiment.

Referring to FIG. 6, another embodiment of a method for hot wire welding and cladding using wire force feedback is shown. In FIG. 6, each overall loop could take place in a matter of microseconds or less, depending upon the calibration of the feedback system. In step 420, the welding apparatus control circuitry 115 obtains a measurement of force feedback from the wire 108. As discussed above, the force feedback from the wire 108 may be measured directly via a force measuring device, such as a dynamometer or a load cell transducer built into or otherwise connected to the welding apparatus 102, or it may be inferred based on the variation in the wire feed current required by the motor 106 to keep the wire feed speed constant. In step 422, the control circuitry 115 determines whether the force feedback has increased or is increasing relative to a past measurement. Although not illustrated, the rate of increase could be determined as well, using, e.g., a series of measurements, and the differences between. In step 424, if the force feedback is increasing, the wire heating current is increased to counter the increased resistance. Then the process returns to step 420 for another measurement.

However, if the force feedback has not increased or is not increasing, then the process proceeds to step 426 to determine if the force feedback has decreased or is decreasing. Although not illustrated, the rate of decrease could be determined as well, using, e.g., a series of measurements, and the differences between. In step 426, if the force feedback is decreasing, the wire heating current is decreased to counter the decreased resistance. Then the process returns to step 420 for another measurement.

If the force feedback is neither increased/increasing nor decreased/decreasing, the process returns to step 420 for another measurement.

Again, this process correspondingly increases or decreases the wire temperature to ensure plastic deformation at the tip 116 while preventing the tip 116 of the wire 108 from becoming liquid. Alternatively or in addition, the control circuitry 115 can vary one or more of the wire feed speed and power output of the laser 118 in order to ensure plastic deformation of the wire tip 116, while preventing it from turning liquid.

Although not expressly depicted in the drawings, it may be desirable to include some hysteresis in the feedback and adjustment process avoid unnecessary or detrimental constant minor adjustments or to accommodate adjustment reaction times.

Figure 7:
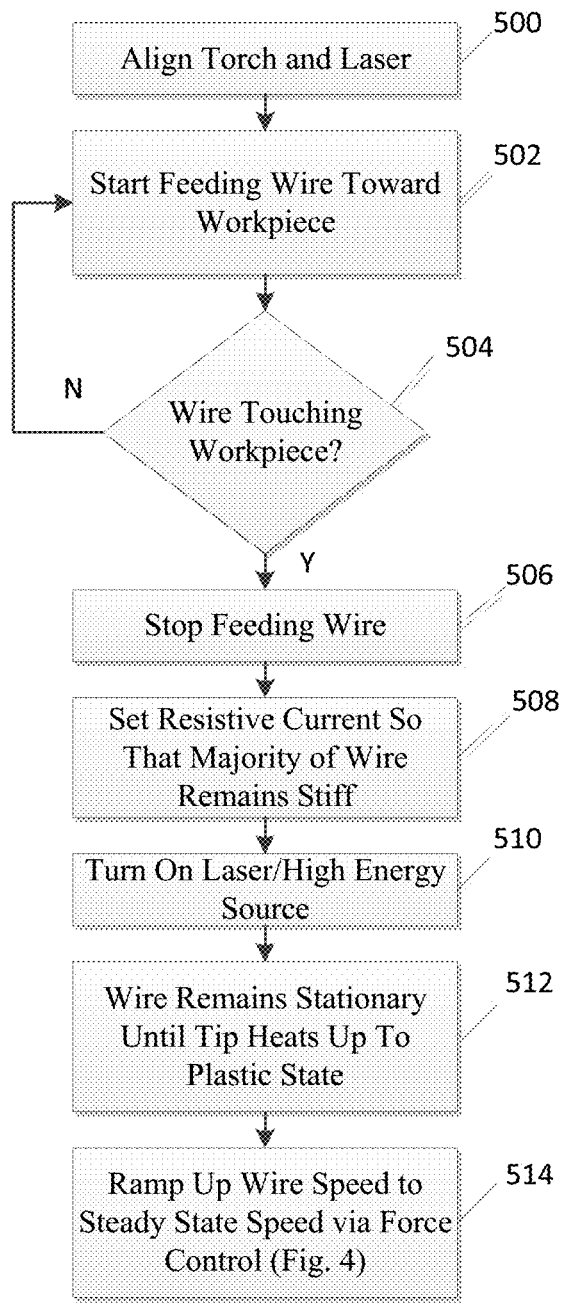
FIG. 7 is a flow chart illustrating a method of force control start operation of the welding system of FIG. 1, according to an embodiment.

Referring to FIG. 7, an embodiment of a method for controlling a start of a hot wire welding or cladding operation is shown. In step 500, the torch 104 is aligned with a high energy heat source device, such as the laser 118. In steps 502-506, the control circuitry 15 directs the motor 106 to begin feeding the wire 108 toward the workpiece 110 until it has determined that the wire 108 is touching the workpiece 110. In an embodiment, the control circuitry 115 determines that the wire 108 is touching the workpiece 110 when a predetermined minimum wire force feedback or voltage signal is detected. At that point, in steps 508-510, the control circuitry 115 sets the resistive heating current applied to the wire so that most of the wire extending from the contact tip remains stiff and activates the laser 118. In step 512, the wire 108 remains stationary until the tip 116 heats up to a plastic state. In one embodiment, the plastic state of the tip 116 is detected when the force feedback from the wire is reduced to a predetermined threshold. Finally, once the wire tip 116 heats up to the plastic state, the control circuitry 115 directs the motor 106 to ramp up the wire feed speed up to a steady state speed for the welding or cladding operation and controls the welding or cladding process via the force feedback method discussed above in connection with FIG. 4.

Figure 8:
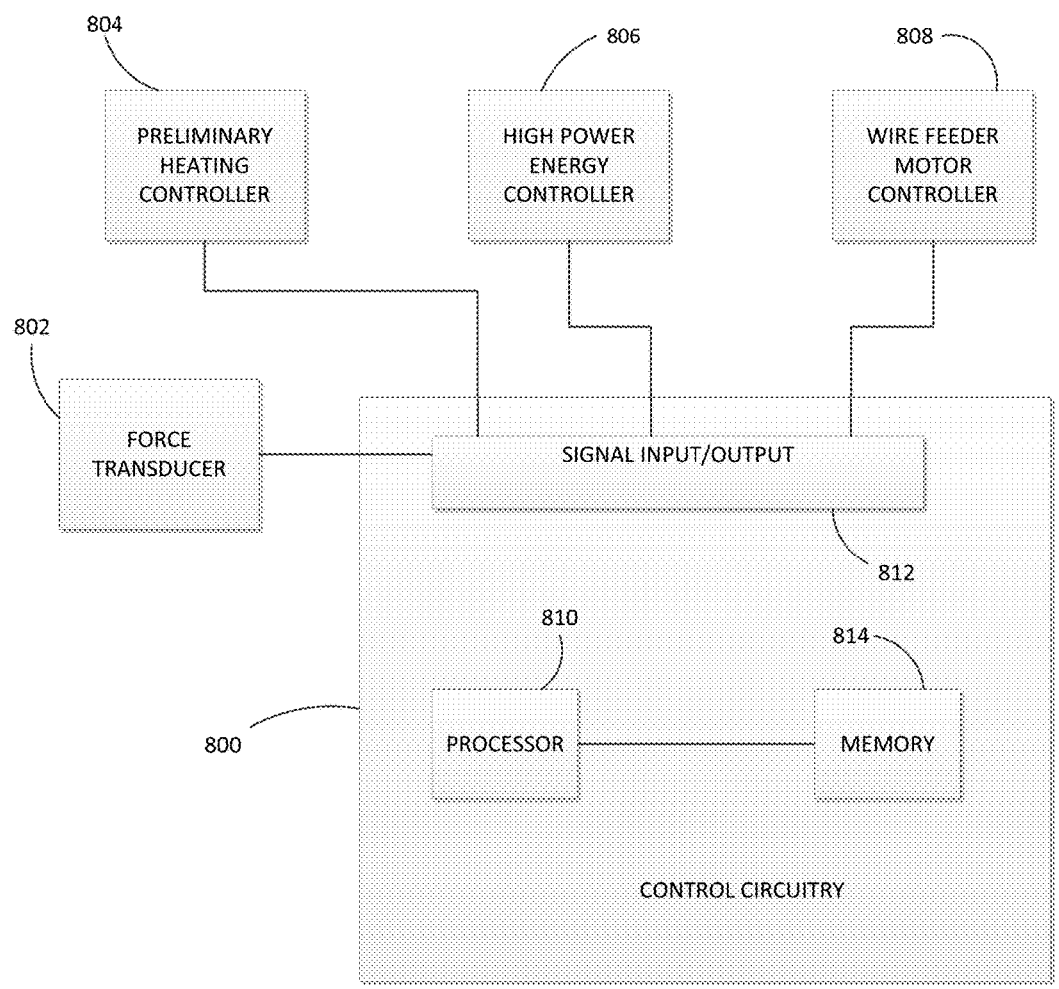
FIG. 8 illustrates a control arrangement.

In FIG. 8, there is illustrated a circuit arrangement in which control circuitry 800 is interconnected with at least one sensor transducer 802, a preliminary wire heater controller 804, a high power energy source controller 806 and a wire feeder motor controller 808. The control circuit 800 operates as described above to receive a force signal indicative of a force on the wire from the transducer 802 and to control operation of the various controllers in accordance with the principles discussed herein, namely, to start and/or adjust preliminary heating of the wire via appropriate signal to controller 804, start and/or adjust application of the high power energy to the wire via appropriate signals to the controller 806, and start, stop and/or adjust the feed speed of the wire feeder motor via appropriate signals to the controller 808.

As illustrated, in an embodiment, the control circuitry 800 includes a processor 810 couple to an input/output section 812 via which signals are input from and output to the transducer and the controllers. Logic executed by the processor is stored in the memory 814 coupled to the processor 810. It can be appreciated that the logic can be in the form of software, firmware or hardware.

Figure 9:
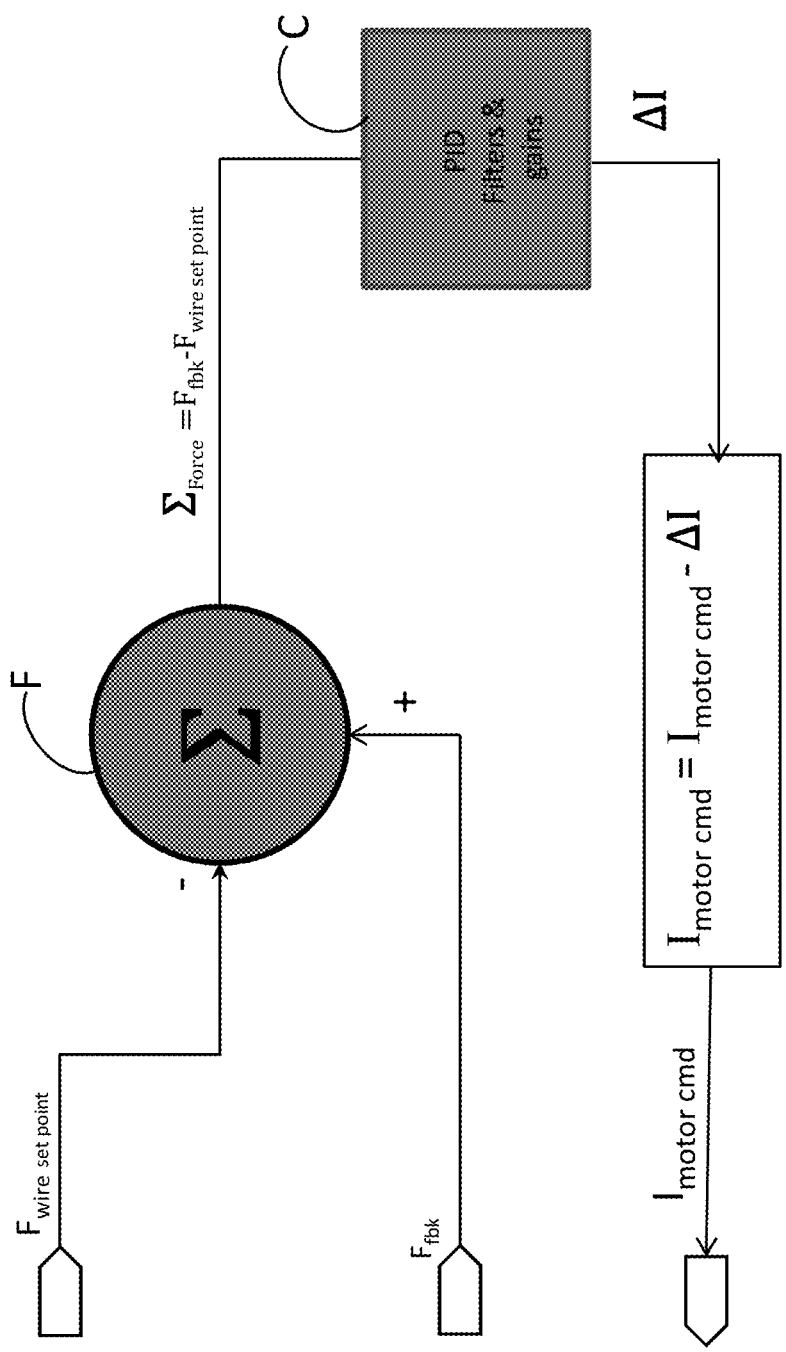
FIG. 9 illustrates another control arrangement.

In FIG. 9, there is illustrated another control scheme. In this scheme, the energy delivered to the wire for heating (e.g., resistive heating) can be maintained at a constant level while the force exerted by the feeder and/or the wire on the feeder is controlled. Feeder motor current is used as a control variable in a force back loop. For this purpose, the following relationship is used:

$$F_{wire} = \frac{T}{r_{drive\ roll}} = \gamma * I_{motor}$$

where T is the torque applied by the feed motor, $r_{driveroll}$ is the radius of the drive roll of the wire feeder, $\gamma$ is a constant, $F_{wire}$ is the force on the wire, and $I_{motor}$ is the wire feeder motor current. In essence, this provides a constant torque feed system.

To that end, a force set point $F_{wire\ set\ point}$ is compared to the force feedback signal $F_{fbk}$, which is either derived from a sensor, such as a load cell or dynamometer, or from the feeder motor current $I_{motor}$. The force feedback $F_{fbk}$ is proportional to the motor current $I_{motor}$. In FIG. 9, the comparison is effected by a summation function F.

The output of the summation function F becomes the force feedback error $\Sigma_{force}$, which is equal to $F_{fbk} - F_{wire\ set\ point}$. This output $\Sigma_{force}$ is feed into a proportional-integral-derivative (PID) controller C with appropriate filters and gains to generate a current difference output $\Delta I$. This output $\Delta I$ is used to control the motor by adjusting feed motor command signal $I_{motor}$, which in turn is used to control the amount of current fed to the motor. This adjustment is accomplished by increasing or decreasing the current fed to the motor, depending on the result of the summation as reflected in the signal $I_{motor}$. For this the relationship is $I_{motor(new)} = I_{motor(old)} + \Delta I$ While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by means of a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make and use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method for controlling a metalworking operation comprising:
   receiving a force signal indicative of a force on a wire being fed from a wire feeder;
   determining a change in the force on the wire or whether the force is outside of a threshold; and
   adjusting a feed rate of the wire based at least in part on the determination.

2. The method of claim 1, wherein the force signal is a signal indicative of a current used by a wire feeder motor, a signal indicative of rotational speed of a wire feeder rotating part, a signal indicative of a torque exerted by the wire feeder motor, or a signal indicative of a counter load exerted on the wire feeder.

3. The method of claim 1, wherein the receiving, determining and adjusting steps are effected by circuitry including logic implementing the method.

4. The method of claim 3, wherein the circuitry includes a processor.

5. The method of claim 1, wherein the step of adjusting includes changing heating of the wire so as to maintain a constant wire feeding rate.

6. The method of claim 1, wherein the step of determining includes determining a change in the force based on a predetermined threshold.

7. The method of claim 6, wherein the step of adjusting includes changing a heating current used to heat the wire based at least in part on a determination that the force is outside of the predetermined threshold.

8. The method of claim 1, further comprising adjusting a heating of the wire based at least in part on the determination, wherein the heating of the wire is directly related to the force so that an increase in force leads to an increase in heating and a decrease in force leads to a decrease in heating.

9. The method of claim 1, wherein the force signal directly relates to the force on the wire.

10. The method of claim 9, wherein the force signal is a signal from a dynamometer or a load cell transducer.

11. The method of claim 1, wherein the force signal indirectly relates to the force on the wire.

12. The method of claim 11, wherein the force signal indicative of a feed motor current, feed motor torque or rotational speed for a feed motor rotating part.

13. The method of claim 1, wherein the energy delivered to the wire for heating is maintained at a constant level and a current of a wire feed motor is used as a control variable in a force feedback loop, using the following relationship:

$$F_{wire} = \frac{T}{r_{drive\ roll}} = \gamma * I_{motor}$$

where $F_{wire}$ is a force on the wire, T is a torque applied by the wire feed motor, $\gamma$ is a constant, $r_{drive\ roll}$ is a radius of a drive roll of the wire feeder, and $I_{motor}$ is the wire feed motor current.

14. A metalworking apparatus comprising:
a wire feeder configured to feed a wire onto a workpiece;
heating circuitry to heat the wire; and
control circuitry configured to (a) receive a force signal indicative of a force on the wire contacting the workpiece, (b) determine whether the force exceeds a threshold, and (c) adjust either the heating of the wire, or a feed rate of the wire, or both based, at least in part, on the determination.

15. The apparatus of claim 14, wherein the force signal is a signal indicative of a current used by a wire feeder motor, a signal indicative of rotational speed of a wire feeder rotating part, a signal indicative of a torque exerted by the wire feeder motor, or a signal indicative of a counter load exerted on the feeder.

16. The apparatus of claim 14, wherein:
the heating circuitry includes a heating power supply that supplies a heating current to the wire; and
the control circuitry adjusts the heating current based on the determination.

17. The apparatus of claim 14, wherein the heating is directly related to the force so that an increase in force leads to an increase in heating and a decrease in force leads to a decrease in heating.

18. The apparatus of claim 14, wherein:
the heating circuitry includes a heating power supply that supplies heating current to the wire; and
the control circuitry is configured to determine whether the force is outside a predetermined force threshold.

19. The apparatus of claim 14, further comprising a wire feed motor configured to maintain a constant wire feed rate.

20. The apparatus of claim 14, wherein the force signal directly relates to the force on the wire.

21. The apparatus of claim 20, wherein the force signal is a signal from a dynamometer or a load cell transducer.

22. The apparatus of claim 14, wherein the force signal indirectly relates to the force on the wire.

23. The apparatus of claim 22, wherein the force signal indicative of a feed motor current, feed motor torque or rotational speed for a feed motor rotating part.

24. The apparatus of claim 14, wherein the control circuitry implements a constant torque control scheme.

* * * * *